United States Patent
Higashino et al.

[11] Patent Number: 5,309,631
[45] Date of Patent: May 10, 1994

[54] ROLL MANUFACTURING METHOD

[75] Inventors: Tetsuo Higashino, Omihachiman; Shosaku Nakamura, Shiga; Akira Iimurou; Misao Maeyama, both of Uzi; Yoshimi Fukushige, Itami, all of Japan

[73] Assignee: Tohoyogyo Co., Ltd., Shiga, Japan

[21] Appl. No.: 34,751

[22] Filed: Mar. 18, 1993

[30] Foreign Application Priority Data

Aug. 31, 1992 [JP] Japan .................. 4-257429

[51] Int. Cl.$^5$ .............................. B23P 15/00
[52] U.S. Cl. .................. 29/895.21; 29/895.3; 492/48; 492/55
[58] Field of Search ........... 29/895.2, 895.211, 895.21, 29/895.3, 445; 492/43, 44, 48, 55

[56] References Cited

U.S. PATENT DOCUMENTS

| | | | |
|---|---|---|---|
| 1,943,215 | 1/1934 | Dunlap | 29/895.211 |
| 3,534,458 | 10/1970 | McCrea | 29/895.211 |
| 4,065,842 | 1/1978 | Anatinen | 29/895.211 |
| 4,084,302 | 4/1978 | Anatinen | 29/895.211 |
| 4,951,392 | 8/1990 | Miihkinen | 29/895.211 |
| 5,091,027 | 2/1992 | Watanabe | 29/895.211 |

*Primary Examiner*—Irene Cuda
*Attorney, Agent, or Firm*—Jones, Tullar & Cooper

[57] ABSTRACT

One end of a belt-like fiber material is longitudinally sewn by a sewing machine using a sewing thread. The tensile strength of a bobbin thread is preferably higher than that of a needle thread. In this state, one end of the belt-like fiber material is sewn while being drawn by the bobbin thread, whereby the longitudinal length of the sewn end becomes shorter than that of the other end. As a result, the belt-like fiber material forms a circular arc with the inside surface of the arc being formed by the sewn end while the outside surface of the arc being formed by the other end. The circular arc shaped by the sewn belt-like material is then mounted on a roll shaft in such a manner that the thick face of the sewn end comes in contact with the roll shaft.

6 Claims, 1 Drawing Sheet

ROLL MANUFACTURING METHOD

BACKGROUND OF THE INVENTION

1. Technical Field

The present invention relates to a roll manufacturing method for use in various types of equipment and apparatus and, more particularly, to a method suitable for manufacturing a heat resistant roll for use in or with the manufacture of steel plate equipment containing a continuous annealing apparatus or a plating apparatus.

2. Prior Art

Hitherto, various types of fiber rolls have been manufactured in place of steel rolls and rubber rolls. One of the conventional manufacturing methods of such fiber rolls comprises the steps of punching doughnut-shaped disks having a predetermined size out of a sheet-like fiber material such as non-woven fabric, putting a plurality of such disks around a roll shaft by piecing the roll shaft into hollow parts of the disks, and applying a pressure to the disks in the axial direction for compressively molding a fiber roll.

A serious disadvantage, however, exists in the mentioned conventional manufacturing method in that since doughnut-shaped disks are punched out of a sheet-like fiber material, portions corresponding to the hollow part of the doughnut-shaped disk and the outer periphery thereof are left as unused fragments or scraps after the punching out step, eventually resulting in uneconomical use of the entire sheet-like fiber material. In particular, when employing some expensive material as a sheet-like fiber material, the cost of the obtained roll increases sharply, bringing about to a considerable extent the mentioned disadvantage.

SUMMARY OF THE INVENTION

Accordingly, it is an object of the present invention to provide a method for manufacturing a fiber roll by cutting belt-like members out of a sheet-like fiber material instead of punching out the doughnut-shaped disks therefrom, and by processing the belt-like member in a unique manner, thereby achieving an effective use of the entire sheet-like fiber material.

In order to accomplish the foregoing object, a method of manufacturing a fiber roll in accordance with the present invention comprises the steps of sewing one end of a belt-like fiber material in the longitudinal direction with a sewing thread so that the longitudinal length of one side of the belt-like fiber material is shorter than the other side thereby forming a circular arc in which the other side or side the sewn end occupies inside surface of the arc while the other end or side occupies the surface thereof outside, and mounting the thus sewn belt-like fiber material on a roll shaft in such a manner that a thick face or inside surface of the sewn end comes in contact with the roll shaft.

More specifically, first several belt-like fiber members are prepared in the present invention. These belt-like fiber members may be prepared by cutting a sheet-like fiber material in the longitudinal direction, or they may be obtained directly in manner known in the art. The width of the belt-like fiber members may be freely selected, but generally in the range of about 3 to 10 cm. The thickness of the belt-like fiber members may also be freely selected but generally in the range of about 1 to 3 mm. The apparent density of the belt-like fiber members may also be freely selected but is not required to be extremely high, and generally in range of about 0.4 to 0.7 g/cm$^3$. Various known material may be employed as the mentioned sheet-like fiber material including non-woven fabric, felt, knit, woven fabric or the like. As for the fiber forming the mentioned fiber material, synthetic fiber, semi-synthetic fiber, natural fiber and any other adaptable fiber are singly or mixedly employed. The present invention is particularly advantageous when employing the fiber material of expensive synthetic fiber. Para aromatic polyamide fiber (heat resistant to 300° C.), aromatic polyamide fiber (heat resistant to 200° C.), polyphenylene sulfide fiber (heat resistant to 260° C.), phenolic resin fiber (heat resistant to 250° C.), special polyester fiber (heat resistant to 220° C.), etc., are included in the mentioned expensive fiber, for example.

The next step is to sew one end of the belt-like fiber materials, i.e., either the left end or the right end, with a sewing thread in the longitudinal direction. The belt-like fiber material is composed of one belt-like fiber member, or at least two belt-like fiber members overlapping one another. In the sewn step, it is sufficient to sew either one belt-like fiber member or two overlapping members together thereby forming one sewn material. It is also sufficient to combine two such sewn materials by further sewing them together respectively formed of two belt-like members (in this case, a secondary sewn material formed of four belt-like fiber members is obtained). What is essential in the sewing step in the method according to the present invention is to sew one end in such a manner that the one end may be undulated or gathered a little, whereby the longitudinal length of the one end may be shorter than the longitudinal length of the other free end. More specifically, it is essential in the sewing, by means of a sewing machine, to establish a difference in tensile strength between a needle thread and a bobbin thread, and sew one end while drawing with either thread having higher tensile strength, so that the longitudinal length of the sewn end may be shorter than that of other free end as mentioned above. The tensile strength of the needle thread or bobbin thread may be freely selected, but it is preferred to have tensile strength of the needle thread of about 10 kg while having a tensile strength of the bobbin thread of about 20 kg. For carrying out the sewing step manually, it is required to sew one end while shortening the longitudinal length thereof a little, so that the longitudinal length of the sewn end may be shorter than that of the other end. In addition, any sewing thread may be freely employed, and it is particularly preferred to employ a sewing thread comprised of the same kind of fiber as the fiber forming the belt-like fiber material.

Other objects, features and advantages of the present invention will become apparent in the course of the following description in conjunction with the accompanying drawing.

DETAILED DESCRIPTION

Figure 1:
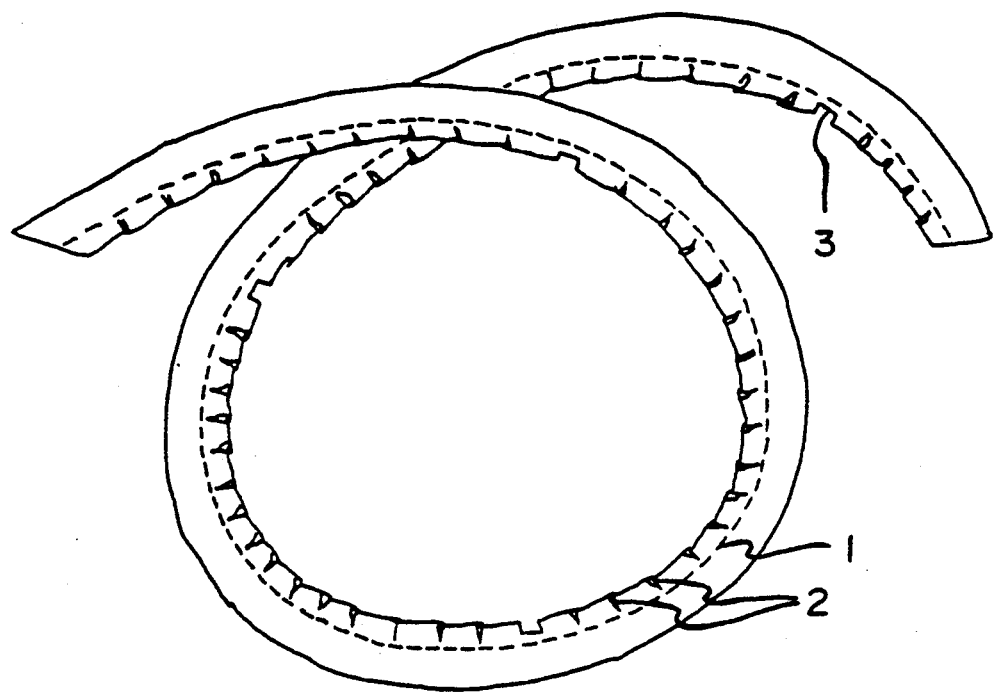
FIG. 1 is a plan view of a belt-like fiber material of which one end is sewn with a sewing thread.

When sewing the belt-like fiber material with the sewing thread in the mentioned manner, the longitudinal length of one end becomes shorter than that of the other end, whereby a circular arc is formed such that the sewn one end occupies inside surface of the arc while the other end occupies the outside surface of the arc, as shown in FIG. 1, for example. In the drawing, reference numeral 1 denotes a sewing thread, numeral 2 denotes wrinkles formed as a result of shortening the longitudinal length of one end, numeral 3 denotes the concave parts formed corresponding to convex parts for prevention of idle rotation formed on the roll shaft. The radius of curvature of this circular arc may be set to be equivalent to the radius of a roll shaft on which the roll is to be mounted. The radius of curvature of the circular arc may be freely selected depending upon the measure of shortening the longitudinal length of the sewn one end.

Then, the sewn belt-like fiber material formed into such a circular arc member is taken up or wound around a roll shaft in such a manner that a thick surface of one end comes in contact with the roll shaft. In the case where the longitudinal length of the sewn belt-like fiber material is endless, the sewn belt-like fiber material may be easily mounted on the roll shaft by continuously winding the sewn belt-like fiber material spirally around the roll shaft. In the case where the sewn belt-like fiber material is of limited length, after spirally winding the sewn belt-like fiber material of such limited length, another sewn belt-like fiber material may be superposingly wound around the roll shaft at the end of and as a continuation of the end of the preceding sewn belt-like fiber material. Then, in the same manner as the conventional fiber roll using doughnut-shaped disks, compression molding is axially applied from two opposite sides, followed by lathe machining into a roll-shaped product, and further followed by impregnation with a resin, thus finally obtaining a fiber roll of the desired hardness.

It is also preferred that the sewn belt-like fiber material is further subject to a drawing treatment and thereafter wound around the roll shaft, instead of winding the sewn belt-like fiber material as it is. When applying such a drawing treatment beforehand, the sewn belt-like fiber material is desirably less stretchable at the winding step. It is also contemplated that, instead of winding directly around the roll shaft, a fiber roll is obtained by winding the sewn belt-like fiber material around a provisional shaft, molding the wound material compressively from two sides in the axial direction, thereby forming the compressed material into a roll, impregnating the roll with resin, removing the provisional shaft out of the roll to obtain a hollow cylinder of the sewn belt-like fiber material, and mounting the hollow cylinder on the roll shaft.

EXAMPLE 1

A para aromatic polyamide fiber of 1.5 denier in fineness was employed to prepare a sheet-like felt of 400 g/m² in unit weight and 2.5 mm in thickness. Belt-like felts (belt-like fiber members) each of 50 mm in width were cut out from this sheet-like felt. Two belt-like felts were then overlapped, and the right end of the overlapping two belt-like felts was longitudinally sewn by means of a sewing machine, whereby a primary sewn material comprised of two partially sewn belt-like felts was obtained. This primary sewn material was shaped into a circular arc with its right side curved. Further, two such primary sewn materials were overlapped and the right end of the overlapping two primary sewn materials was longitudinally sewn by means of a sewing machine, whereby a secondary sewn material comprised of two (partially sewn) primary sewn materials was obtained. This secondary sewn material was also shaped into a circular arc with its right side curved. In the sewing step, 10 kg of tensile strength was applied to the needle thread, while applying 20 kg of tensile strength to the bobbin thread. A thread of para aromatic polyamide multifilaments was employed as both needle and bobbin thread.

Concaves formed corresponding to the convexes for prevention of idle rotation formed on the roll shaft were formed on the thick face on the right side of the obtained secondary sewn material. Then, the secondary sewn material was rolled spirally 1300 times in such a manner that the thick face on the right side of the secondary sewn material would come in contact with the surface of the roll shaft (of 810 mm in shaft diameter and 3055 mm in length), whereby a cylindrical material was prepared. This cylindrical material was then subjected to compression molding in such a manner as to be axially compressed from two sides of the roll shaft. The cylindrical material in such a compressively molded state was then formed into a roll. Subsequently, the rolled cylindrical material was impregnated with a ceramic coating agent (the solid portion of which was 30% by weight) as described below, then dried and cured at 140° C. for 90 min, thus a final roll was obtained. In this roll, the solid portion of the ceramic coating agent was contained in the proportion of 10 g to 100 cm³ of the cylindrical material.

| (Prescription of ceramic coating agent) | |
|---|---|
| Main component | silicon oxide |
| Solvent | isopropyl alcohol |
| Viscosity | 900 cp |
| Density | 1.3 |
| pH | 12 |

The roll obtained in the mentioned manner was 900 mm in external diameter (considering that the external diameter of the roll shaft was 810 mm, the cylindrical material was 45 mm in thickness), and 2600 mm in width. The density of the cylindrical material was 0.61 g/cm³ and the hardness thereof was 95 degrees. Since para aromatic polyamide fiber, excellent in heat resistance, was employed in this example, the roll was preferably used as a heat resistant bridle roll.

EXAMPLE 2

A sheet-like felt the same as the foregoing Example 1 was employed. Belt-like felts (belt-like fiber members) of 30 mm in width were cut out from this sheet-like felt. Two such belt-like felts were then overlapped and the right end of the overlapping two belt-like felts was longitudinally sewn by means of a sewing machine, whereby a primary sewn material comprised of two partially sewn belt-like felts was obtained. This primary sewn material was shaped into a circular arc with its right side curved. In the sewing step, 10 kg of tensile strength was applied to the needle thread, while applying 20 kg of tensile strength to the bobbin thread. A thread of para aromatic polyamide multifilaments was employed as both needle and bobbin thread.

The primary sewn material thus obtained was then subjected to a drawing treatment to reduce further extension. Thereafter, this primary sewn material was rolled spirally in such a manner that the thick face on the right side of the primary sewn material would come in contact with the provisional shaft (of 239 mm in shaft diameter and 250 mm in length) while applying a slight drawing thereto, whereby a cylindrical material was prepared. This cylindrical material was then subjected to compression molding in the axial direction of the provisional shaft. The cylindrical material in such a compressively molded state was then impregnated with a ceramic coating agent as described below, then dried and cured at 150° C. for 60 min. The cured cylindrical material was then taken off of the provisional shaft, whereby a block-like cylindrical material of 200 mm in height was obtained. Then, fourteen such block-like cylindrical materials were mounted serially on the roll shaft (of 240 mm in shaft diameter and 3050 mm in length) by piercing the roll shaft into hollow parts of the block-like cylindrical materials. These serially mounted block-like cylindrical materials were further subjected to compression molding in such a manner as to be axially compressed from two sides, whereby a final roll was obtained.

| (Prescription of ceramic coating agent) | |
| --- | --- |
| Main component | zirconia silica |
| Solvent | isopropyl alcohol |
| Viscosity | 1300 cp |
| Density | 2.7 |
| pH | 12 |

The roll obtained in the mentioned manner was 300 mm in external diameter (considering that the external diameter of the roll shaft was 240 mm, the cylindrical material was 30 mm in thickness), and 2600 mm in width. The density of the cylindrical material was 0.65 g/cm$^3$ and the hardness thereof was 96 degrees. Since para aromatic polyamide fiber, excellent in heat resistance was, employed in this example, the roll was preferably used as a heat resistant pinch roll.

EXAMPLE 3

A sheet-like non-woven fabric of 250 g/m$^2$ in unit weight and 1.0 mm in thickness comprised of polyphenylene sulfide fiber having finess distribution of 2 to 15 denier was employed in this example. Belt-like non-woven fabrics (belt-like fiber members) of 30 mm in width were cut out from the sheet-like non-woven fabric. Five such belt-like non-woven fabrics were then overlapped and the right end of the overlapping five belt-like non-woven fabrics was longitudinally sewn, whereby a primary sewn material comprised of five partially sewn belt-like non-woven fabrics was obtained. This primary sewn material was shaped into a circular arc with its right side curved. Subsequently, two such primary sewn materials were further overlapped and the right end of the overlapping two primary materials was longitudinally sewn by means of a sewing machine, whereby a secondary sewn material comprised of two primary sewn materials was obtained. This secondary sewn member was also shaped into a circular arc with its right side curved. In the sewing step, 10 kg of tensile strength was applied to the needle thread while applying 20 kg of tensile strength to the bobbin thread. A thread of para aromatic polyamide multifilaments was employed as both needle and bobbin thread.

The secondary sewn material thus obtained was then rolled spirally 5120 times in such a manner that the thick face on the right side of the secondary sewn material would come in contact with the surface of the roll shaft (of 240 mm in shaft diameter and 3050 mm in length), whereby a cylindrical material was prepared. This cylindrical material was then subjected to compression molding by axially compressing against the roll shaft from two sides of the roll shaft. The cylindrical material in such a compressively molded state was then formed into a roll. The roll obtained in the mentioned manner was 300 mm in external diameter (considering that the external diameter of the roll shaft was 240 mm, and the roll was 30 mm in thickness), and 2600 mm in width. The density of the cylindrical material was 0.65 g/cm$^3$. Since para aromatic polyamide fiber excellent in heat resistance was employed in this example, the roll was preferably used as a heat resistant pinch roll.

As has been described so far, there is provided according to the present invention a method for producing a roll by preparing belt-like members from a sheet-like fiber material and forming a roll using the belt-like members. Accordingly, a remarkable technical advantage of effective utilization of the sheet-like fiber material is performed as compared with the conventional roll production process in which doughnut-shaped disks are punched out of the sheet-like fiber material. More specifically, in the case of punching doughnut-shaped disks, the loss percentage of raw material amounts to more or less 55%. On the contrary, when using the method according to the invention, the loss percentage of raw material is 0%. Consequently, the invention assures an advantage of effective utilization of the entire sheet-like fiber material and, as a result, the cost of the roll can be further decreased when the cost of raw material is higher.

What is claimed is:

1. A method of manufacturing a fiber roll from a longitudinally extending belt-like fiber material and a roll shaft, comprising the steps of:

sewing one end of the belt-like fiber material in the longitudinal direction with a sewing thread so that the length of one side of the belt-like fiber material is shorter than the other side, thereby forming a circular arc with the belt-like fiber material with the shorter side forming the inside surface of the arc; and mounting the thus sewn belt-like fiber material on a roll shaft such that the inside surface of the arc contacts the roll shaft.

2. The method as defined in claim 1, wherein the fiber of the belt-like fiber material and the thread comprise the same material.

3. The method as defined in claim 1, wherein the belt-like fiber material is selected from the non-woven fabric, felt, knit, and woven fabric.

4. The method as defined in claim 3, wherein the fiber of the belt-like fiber material is selected from synthetic fiber, semi-synthetic fiber and natural fiber.

5. The method as defined in claim 3, wherein the fiber of the belt-like fiber material is selected from para aromatic polyamide fiber, aromatic polyamide fiber, polyphenylene sulfide fiber, phenolic resin fiber and polyester fiber.

6. The method as defined in claim 1, wherein the sewing is performed with a sewing machine such that the tensile strength of the needle thread is different from the tensile strength of the bobbin thread.

* * * * *